US008055814B2

(12) United States Patent
Sichner et al.

(10) Patent No.: US 8,055,814 B2
(45) Date of Patent: Nov. 8, 2011

(54) UNIVERSAL SAFETY I/O MODULE (75) Inventors: Gregg M. Sichner, Mentor, OH (US); Joseph G. Vazach, Mentor, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1364 days.

(21) Appl. No.: 11/240,706

(22) Filed: Sep. 30, 2005

(65) Prior Publication Data
US 2006/0224811 A1 Oct. 5, 2006

Related U.S. Application Data (60) Provisional application No. 60/663,329, filed on Mar. 18, 2005.

(51) Int. Cl.
G06F 3/00 (2006.01)
G05B 15/00 (2006.01)

(52) U.S. Cl. .............. 710/38; 710/306; 700/1; 700/21; 340/2.1

(58) Field of Classification Search ............. 710/306
See application file for complete search history.

(56) References Cited

U.S. PATENT DOCUMENTS

| 5,764,927 | A  | * | 6/1998  | Murphy et al. ............ 710/105 |
| 6,516,041 | B1 | * | 2/2003  | Curreri ...................... 376/217 |
| 6,532,508 | B2 | * | 3/2003  | Heckel et al. ............. 710/110 |
| 6,549,034 | B1 |   | 4/2003  | Pietrzyk et al. |
| 6,721,900 | B1 | * | 4/2004  | Lenner et al. .................. 714/4 |
| 6,832,343 | B2 | * | 12/2004 | Rupp et al. .................. 714/47 |
| 7,149,655 | B2 | * | 12/2006 | Frederick et al. ........... 702/182 |
| 7,162,311 | B2 |   | 1/2007  | Muneta et al. |
| 2003/0171740 | A1 |   | 9/2003  | Stiller et al. |
| 2003/0208283 | A1 | * | 11/2003 | Vasko et al. ................. 700/21 |
| 2004/0059844 | A1 | * | 3/2004  | Jones et al. ................. 710/15 |
| 2004/0153534 | A1 | * | 8/2004  | Gibart et al. ............... 709/223 |
| 2004/0181296 | A1 | * | 9/2004  | Muneta et al. ............... 700/21 |
| 2004/0210326 | A1 | * | 10/2004 | Muneta et al. ............... 700/82 |
| 2004/0210620 | A1 | * | 10/2004 | Muneta et al. .............. 709/200 |

(Continued)

FOREIGN PATENT DOCUMENTS

CN 1463520 12/2003

(Continued)

OTHER PUBLICATIONS

'Essays on the Use of AI' found at http://library.thinkquest.org/2705/applications.html, published beginning in 2000.*

(Continued)

Primary Examiner — Henry Tsai
Assistant Examiner — Steven Snyder
(74) Attorney, Agent, or Firm — Fay Sharpe LLP; R. Scott Speroff; John M. Miller (57) ABSTRACT

A safety control block interfaces to one or more devices utilizing one or more communication protocols wherein a network interface receives and/or transmits data directly from a network. A backplane interface receives and/or transmits data from a backplane. A backplane extension receives and/or transmits data from a backplane. A processing component receives data from at least one of the network interface, backplane interface and backplane extension and determines if the received data is related to safety or non-safety. A safety I/O circuitry receives safety data from the processing component; wherein the safety data is utilized to communicate to at least one control device.

21 Claims, 7 Drawing Sheets

U.S. PATENT DOCUMENTS

| | | | |
|---|---|---|---|
| 2004/0215354 A1* | 10/2004 | Nakamura et al. | 700/21 |
| 2004/0224641 A1* | 11/2004 | Sinn | 455/73 |
| 2004/0230323 A1* | 11/2004 | Glanzer et al. | 700/18 |
| 2005/0060606 A1* | 3/2005 | Kalan et al. | 714/12 |
| 2006/0142873 A1* | 6/2006 | Opem et al. | 700/1 |
| 2007/0299571 A1* | 12/2007 | Laberteaux et al. | 701/24 |

FOREIGN PATENT DOCUMENTS

| | | |
|---|---|---|
| EP | 1 043 641 A | 10/2000 |
| EP | 1 396 963 A | 3/2004 |
| EP | 1 493 960 A2 | 1/2005 |
| WO | WO 2004/095716 A2 | 11/2004 |
| WO | WO 2005/003869 A | 1/2005 |

OTHER PUBLICATIONS

'Internet Archive Wayback Machine' showing publish dates for the Thinkquest website above.*
Australian Patent Office Search Report, mailed Sep. 1, 2006.
European Search Report date Jul. 27, 2007.
Chinese Search Report dated Aug. 15, 2008.

* cited by examiner

UNIVERSAL SAFETY I/O MODULE

CROSS-REFERENCE TO RELATED PATENTS AND APPLICATIONS

This application claims the benefit of U.S. Provisional Patent Application Ser. No. 60/663,329 filed on Mar. 18, 2005 and entitled "Safety I/O Modular and Block System," the entirety of which is incorporated by reference herein.

BACKGROUND

The subject invention relates to industrial controls. It finds particular application in conjunction with combining block and modular I/O, integrating standard and safety messages and bridging of such safety signals in an integrated control network, and will be described with particular reference thereto. However, it is to be appreciated that the present exemplary embodiment is also amenable to other like applications.

Machine control employs digital and/or analog communication to exchange information across various networks. Typically, various protocols are employed with such networks to facilitate communication between a controller(s) and one or more control components such as I/O modules, drives, servos, switches, sensors, etc. Conventional protocols accept data from a source (e.g., controller) and package the data for transmission to one or more data recipients (e.g., control components). In addition, such protocols have limited communication and typically are suitable only for certain layers within an automation pyramid and/or limited in their functionality (e.g., single master system running a master/slave protocol). This may result in barriers within the automation architecture that are difficult to penetrate and that require complex bridging devices without being able to fully bridge the gap between the various systems that are quite different in nature.

Machine control typically includes various safety devices and associated controls that can be used to mitigate machine accidents that can harm an individual. Conventional systems typically hardwire pushbuttons (e.g., an e-stop) directly into a controller to handle emergency situations which could result in harm to an individual. In this manner, a user can shut down an operation by pressing the appropriate button. Safety signals can also be sent through various communication channels within a control system to prevent a potentially dangerous condition from occurring. Such automated intelligence relies on particular signal levels (values) in order to initiate such a related safety change. Thus, maintaining the integrity of such safety signals is critical to insure that appropriate measures are taken in the event of an emergency. In one conventional technique, safety and non-safety data are kept separate, for example, within different networks.

A typical safety network is designed to detect errors and react with pre-determined safe operation. Typically, this means placing the output signals in a state which would cause the machine to stop. The protocol within a safety network takes measures to ensure a high level of integrity within the application. These measures, such as message redundancy and cross-checking, ensure that safety messages are reliably transmitted from one device and received at another in a predetermined time and with the integrity of the data content maintained or that the system goes to a predetermined safety state.

What is needed are systems and methods that permit flexible machine control architecture to transfer safety and non-safety data. Such flexibility includes the ability to transfer safety and non-safety data across multiple protocols within a single control architecture.

BRIEF DESCRIPTION

In accordance with one aspect of the present exemplary embodiment, a safety control block interfaces to one or more devices utilizing one or more communication protocols wherein a network interface receives and/or transmits data directly from a network. A backplane interface receives and/or transmits data from a backplane. A backplane extension receives and/or transmits data from a backplane. A processing component receives data from at least one of the network interface, backplane interface and backplane extension and determines if the received data is related to safety or non-safety. A safety I/O circuitry receives safety data from the processing component; wherein the safety data is utilized to communicate to at least one control device.

In accordance with another aspect of the present exemplary embodiment, a field I/O component processes safety and non-safety data within an industrial control architecture. A non-safety I/O component that receives, processes and outputs data unrelated to safety, wherein the non-safety I/O component is coupled to the expansion port. A bridging element facilitates the communication of safety data to a backplane. An expansion port is coupled to the non-safety I/O component and a universal safety block coupled to the expansion port that receives, processes and outputs data related to safety.

In accordance with yet another aspect of the present exemplary embodiment, a method is utilized to process data within a control architecture. Data is received from a control network and a determination is made as to if the data is related to safety, based at least in part upon interfacing with a safety table. Data related to safety is transmitted to a safety I/O component and the safety data is processed via the safety I/O component.

DETAILED DESCRIPTION

Figure 1:
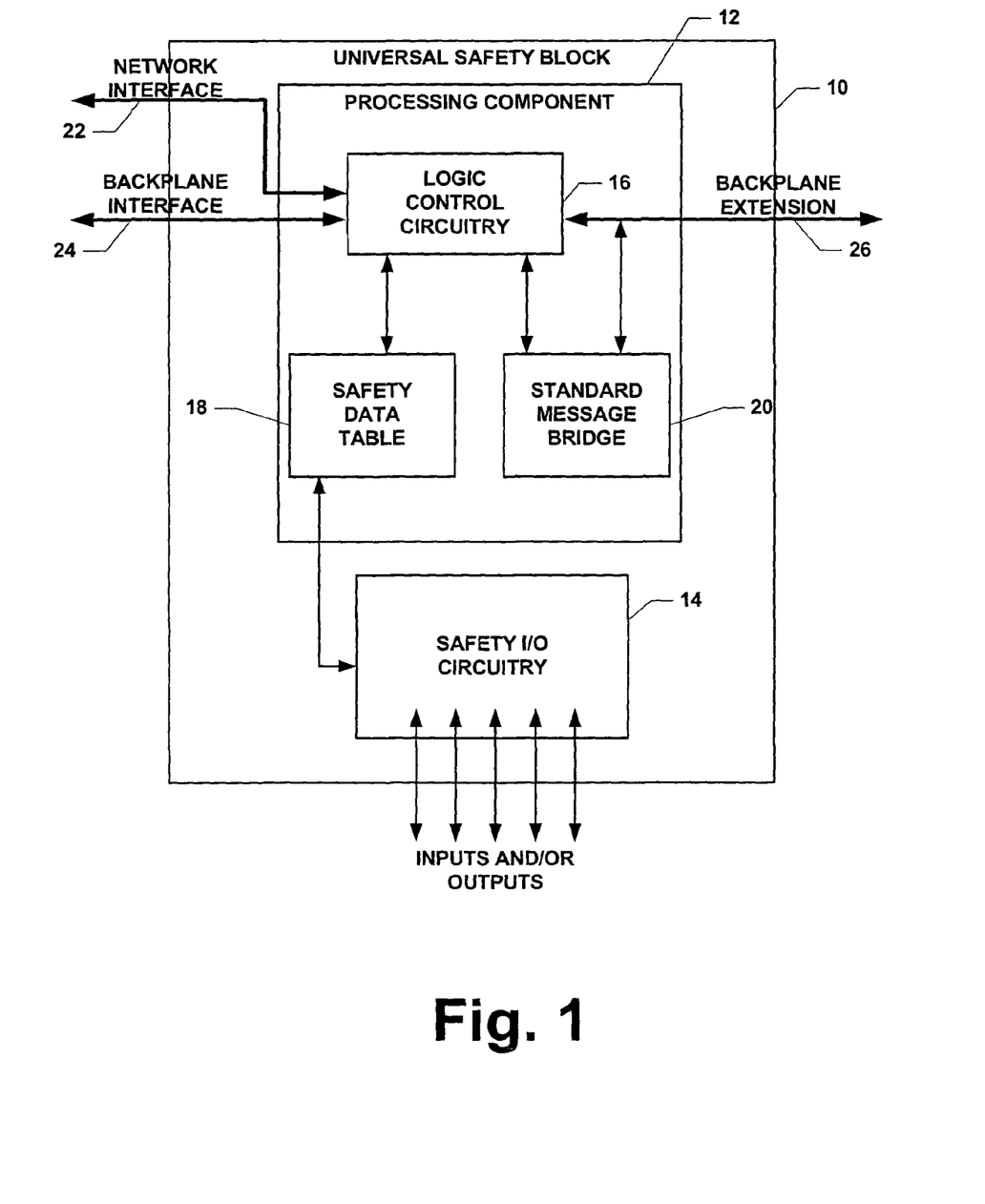
FIG. 1 illustrates a universal safety block that communicates across a plurality of networks, in accordance with an aspect of the subject invention.

FIG. 1 illustrates a universal safety block (USB) 10 that can receive and/or transmit data related to safety and non-safety and process such data accordingly. The USB 10 includes a processing component 12 and safety I/O circuitry 14. The processing component 12 further includes a logic control component 16 and a safety data table 18. A standard message bridge 20 can be employed to transmit non-safety (e.g., standard) data to one or more control components.

The processing component 12 can determine the type, format, source, etc. of data received and determine the appropriate method of processing such data based on one or more factors. The processing component 12 can be substantially any type of logic fabric such as an ASIC, a processor, a discrete logic device, etc. In addition, the processing component 12 can include a memory (not shown) to store, edit, manipulate and retrieve desired data. The logic control component 16 can be employed to determine if received data is related to safety or non-safety and communicate respective data to a predetermined recipient. Such a determination can be made based on information received with the data, format of the data, source of the data, etc.

In one aspect, the logic control component 16 can communicate safety data to the safety data table 18. The safety data table 18 can interface with the safety I/O circuitry 14 to apply to one or more inputs and/or outputs. The safety data table 18 can update the one or more inputs and/or outputs every cycle, predetermined time increment, etc. via the safety I/O circuitry 14.

The safety I/O circuitry 14 can be substantially any hardware and/or software interface wherein data can be transmitted to and/or from the USB 10. The safety I/O circuitry 14 can include one or more features in order to meet a particular safety standard. In one example, the safety I/O circuitry 14 utilizes redundant data paths to prevent a single point of failure. In another example, diagnostics are employed to maintain data integrity.

The USB 10 can be employed in substantially any control environment (e.g., machine, process, safety. etc.) and communicate utilizing substantially any protocol and/or standard. In addition, the USB 10 can employ any number of media to transmit and/or receive data from one or more sources including a wide area network (WAN), a machine area network (MAN), a control area network (CAN), a large area network (LAN), a backplane, etc. The USB 10 can be employed in substantially any location within a control architecture such as a network interface, an expandable safety block, a stand alone safety block, a backplane module, etc.

In order to communicate substantially anywhere within a control architecture, a network interface 22, a backplane interface 24 and a backplane extension 26 can be employed. The network interface 22 can consist of a plug, a receptacle, a screw terminal, etc. that can receive data from a network. In this manner, the USB 10 can directly communicate with one or more networks. The backplane interface 24 can allow the USB 10 to communicate across a backplane to a network interface or other device. The backplane extension can allow the USB to communicate with one or more devices coupled to the USB 10 via a backplane. In one embodiment, the USB 10 can utilize the network interface 22 to receive data from a network and the backplane expansion 24 to propagate received network data to one or more I/O components via a backplane. In another example, when the USB 10 is employed as a standalone block, only the network interface is employed.

Figure 2:
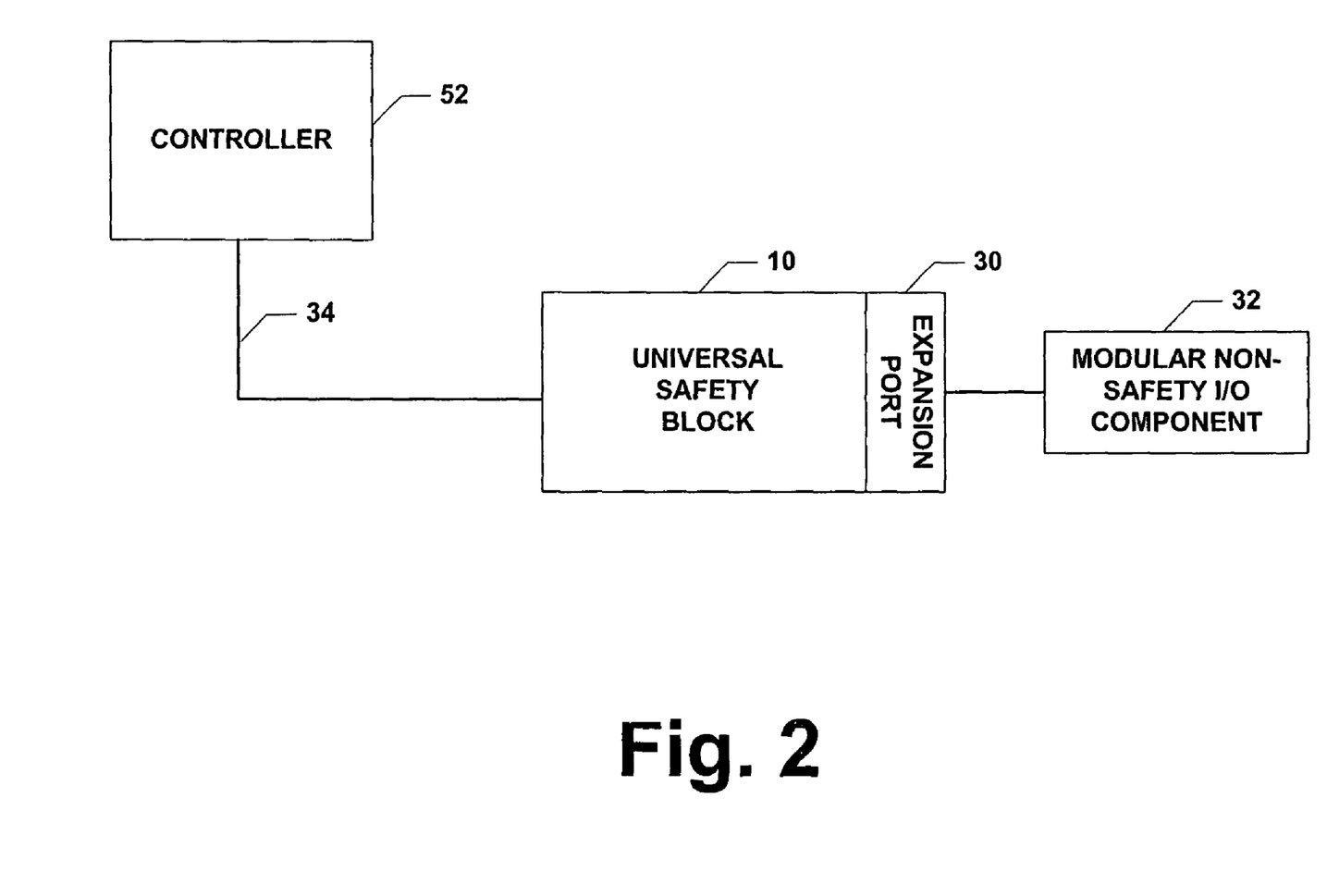
FIG. 2 illustrates an industrial control system that includes a universal safety block coupled with a modular non-safety I/O component, in accordance with an aspect of the subject invention.

With reference to FIG. 2, a control system is shown which includes a controller 52, the USB 10, an expansion port, and a modular non-safety I/O component (MNIC) 32. The USB 10 communicates with the controller 52 via the network 34. The USB 10 can communicate utilizing any number of protocols and/or standards. In one example, the USB 10 can communicate with an Ethernet/IP network. In another example, the USB 10 can communicate with a DeviceNet network. In yet another example, the USB 10 can communicate with an Ethernet/IP, a DeviceNet and a ControlNet network at substantially the same time.

The controller 52 can include one of any number of processors, racks, modules, and/or various hardware and software that accept one or more inputs and allow processing such inputs. Various mathematical, Boolean, etc. functions can be performed on the input data and provide one or more outputs as a result. In addition, the controller 10 can include a memory (not shown) to store data values and/or algorithms for data processing for subsequent configuration and/or retrieval.

The controller 52 can communicate utilizing any number of protocols. In one example, the controller 52 can employ one or more industrial automation protocols such as DeviceNet, ControlNet, Ethernet/IP, etc. In order to facilitate communication utilizing a given network protocol, the network 34 can consist of appropriate media. In one example, the network 34 is a hardwire connection from the controller 52 to the USB 10. In another example, the network 34 consists of wireless transmissions via wireless Ethernet, infrared, Bluetooth or other communication protocols.

The controller 52 can utilize and execute various hardware, firmware and/or software to maintain compliance with one or more safety standards (e.g., IEC 61508) which define a maximum allowable probability of failure on demand. Internal hardware components (not shown) can be duplicative in order to meet various safety redundancy requirements. Similarly, redundant microprocessors (not shown) can be employed to process substantially the same data at substantially the same time. Moreover, firmware can be configured to provide redundant processing algorithms, etc. on data received. By providing such redundancy throughout a system, single point failures can be mitigated.

In one embodiment, receipt of a signal from a field component (e.g., drive, light curtain, motor, switch, safety interlock etc.) is not detected by the control network at a control device (e.g., USB 10, MNIC 32, expansion port 30, etc.) and a warning signal and/or message is sent to one or more processors (e.g., within the controller 52, the USB 10, the expansion port 30, etc.) to indicate such a defective condition. In one example, a defective condition can be determined based on data value, time interval in which data is received, missing information, etc. Monitoring for defective data can be conducted within one or more devices within the industrial control network. In one approach, data quality is monitored at the controller 52, the USB 10, the expansion port 30 and the MNIC 32. In this manner, defective data can be detected and located quickly so that such a condition can be remedied.

When a defective data condition state is located, one or more data values can be held to a pre-determined safe state. In order to respond to such a condition, the controller 52 can provide an appropriate response to one or more control devices (e.g., devices that control a process and/or machine that receive direction from the controller 52). In one example, the control device is a swinging robotic arm wherein the pre-determined safe state is an immediate "power off" condition. In another example, the control device is an exhaust fan wherein the pre-determined safe state is. "power on" ensuring harmful substances cannot accumulate and, if present, are dispersed.

The control network can be deterministic to monitor that all safety messages are transmitted in a predetermined and a predictable amount of time. Each device (e.g., USB 10, MNIC 32, expansion port 30, etc.) within the control network can be customized to have its own periodic response time. From this, each device within the control network can have expectations of guaranteed message delivery. In one approach, one or more safety messages include a timestamp, which is checked to insure that the one or more safety messages arrive within a predefined time expectation. Safety messages arriving beyond the time expectation can cause the affected connection and associated device(s) to go to its pre-determined safe state.

Devices on the control network (e.g., USB 10, MNIC 32, controller 52, etc.) can require a dual channel design for crosschecking of safety messages as they arrive. For example, the network protocol can require that all safety data be transmitted twice; once normal and once with the data inverted. Because data redundancy is built into the network protocol, the dual channels will each pick up messages and cross check results to minimize inaccuracy.

The network 34 can be a communication network with high integrity that operates correctly (with a relatively high degree of confidence) or goes to a pre-defined state. Standard networks achieve a probability of failure on demand that is sufficient for most control applications but insufficient for safety applications. A safety protocol employed on the network 34 can require specific added measures to ensure that safety data sent from one device reaches another device with a higher degree of integrity than a standard network. Whereas standard networking systems are built to tolerate a certain number of errors, safety systems trap errors. Verification of a network's integrity can be obtained by maintaining compliance with one or more third party standards (e.g., IEC 61508).

The USB 10 receives communication sent from the controller 52 via the network 34. The USB 10 can include any number of various input and/or output terminals. Such data can include analog, digital, thermocouple, strain gauge, encoder signals and the like. In one example, the USB 10 includes 8 digital output terminals and 8 digital input terminals. In another example, the USB 10 includes 6 analog outputs and 2 thermocouple inputs. It is to be appreciated that the USB 10 can be employed to accept and/or output data in substantially any desired format and/or protocol.

The expansion port 30 is employed to allow appending additional I/O points on the network 34. The expansion port 30 can contain hardware, firmware and/or software required to maintain compliance with one or more safety standards. In one instance, the firmware regulates how data bridging is accomplished as it is transmitted from the USB 10 to the MNIC 32. Data bridging can regulate the way data is handled as it is transmitted from one device to another within the safety control network.

The MNIC 32 receives data through the expansion port 14 and can include any number of input and/or output terminals which can process substantially any data type. Each terminal can communicate utilizing substantially any desired communication protocol and/or standard. The MNIC 32 can communicate across a backplane (not shown) wherein additional modular I/O components can be added as desired. Individual modular I/O components allow additional I/O to be added on an as needed basis such as when a machine and/or process is augmented and/or reconfigured. In this manner, unnecessary costs can be mitigated by avoiding the purchase of I/O components that are not required.

In another embodiment, the MNIC 32 and the USB 10 are interchanged on the network. In this approach, the MNIC 32 is directly coupled to the network 34 and the expansion port 30 is employed to allow communication from the USB 10 to the network 34. In this example, any number of additional modular I/O components can be added to the system. Also, one or more expansion ports can be employed to allow additional block I/O components and/or modular I/O components to be added to the network.

In one example, the USB 10 and/or expansion port 30 can be updated such that it can handle both safety and non-safety related data. In this approach, network messages can be identified by the USB 10 as either a safety message or a non-safety message and handled accordingly. If a message is identified as a safety message, the message is routed to the safety data table 18 wherein the message is analyzed and processed by the USB 10. Alternatively, if a message is identified as a non-safety message, the message can be bridged to the MNIC 32 for processing. Such data handling can be in compliance with one or more safety standards (IEC 61508) and/or safety integrity levels (e.g., SIL 3, SIL 4, etc.). These standards can prohibit configuration and/or manipulation of safety data to insure that such data is not compromised as it is transmitted throughout the control network.

The MNIC 32 accepts data from the network 34 via the USB 10 and processes one or more non-safety data packets. The MNIC 32 can include one or more modular devices wherein each device can contain one or more terminals that relate to any number of various data types. In one example, a modular device includes two digital outputs and two digital inputs. In another example, a modular device includes four analog outputs. It is to be appreciated that any number, type and combination of inputs and/or outputs are contemplated. In one approach, a combination of safety and non-safety modular devices are employed. Additional modular devices can be added to the MNIC 32 as needed.

The MNIC 32 and the USB 10 can be contained in any number form factors, housings, profiles and the like. In one example, the USB 10 and the MNIC 32 are contained in a form factor that substantially protects against dust and immersion in liquid between 15 centimeters and 1 meter (e.g., meeting IP 67 requirements). In another approach, the MNIC 32 and the USB 10 are hermetically sealed to prevent contaminants and/or other particulate matter from disrupting operation of these I/O devices.

The network can communicate utilizing any protocols, standards, etc. In one embodiment, the network 34 communicates utilizing one or more industrial automation protocols such as DeviceNet, ControlNet and EtherNet/IP to seamlessly integrate I/O control, device configuration and data collection. Utilizing industrial automation protocols to communicate safety data on one standard network can be a cost effective approach that reduces cabling, improves productivity and reduces safety hazards. Industrial automation protocols and/or networks can allow a user to view the control network from an office environment or any point in the system, drilling down to device level information on the plant floor and can provide seamless communication across networks. In this manner, a user can control, configure and collect data from across the enterprise.

Utilizing one or more industrial automation protocols to communicate safety data can allow the combination of safety and non-safety data within a single control network. In addition, preexisting networks can be updated to process safety data alongside non-safety data in conformance with various safety standards. Thus, a user can combine safety and non-safety networks without having to invest in safety specific gateways and bridges, without additional programming languages and without additional training and maintenance associated with a new network or software. Such technology can utilize existing cables and build on programming and training already used, which can provide simpler installation and maintenance. This also enables users to upgrade their networks while both protecting their initial investment and maintaining existing functionality (e.g., non-safety data processing).

One advantage of employing one or more industrial automation protocols to communicate on the control network is the ability to connect safety devices and standard devices on the same network or wire, either with or without the need for a safety controller. For example, utilizing DeviceNet safety, safety interlock switches can operate alongside variable speed drives, safety network monitors with light curtains, and safety programmable logic controllers with standard programmable logic controllers (PLCs). In this manner, the integrity of the safety control loop is not affected by any of the standard control devices regardless of the combination of devices that are employed.

Thus, by utilizing an industrial automation protocol (e.g., DeviceNet, EtherNet/IP, etc.), the safety aspects of a control architecture can be automated in the same manner as a standard control environment. Regardless of whether the safety and standard controls remain separate or are integrated, the user can apply the benefits gained from using DeviceNet on non-safety equipment to safety applications also, such as reduced engineering and installation costs, increased diagnostics and increased architectural flexibility.

In another embodiment, a safety loop can be constructed that does not require a controller. In this approach, peer-to-peer communications can allow sensors to communicate directly with actuators or safety relays, with seamless bridging and routing that can allow safety relays on one segment of the control network to connect to safety mats or light curtains on another. Thus, "end to end" safety allows such a loop to be closed with standard, commercial switch and bridge technology.

Complex sequential control of safety loops can similarly be effected utilizing safety controller technology with PLCs connected either to different industrial automation protocol segments (e.g., one EtherNet/IP and another DeviceNet), responding to presence sensing safety devices and controlling safety actuators on a local network segment, or on one or more remote segments utilizing an industrial automation protocol bridging and routing capabilities. In this manner, segmentation of the network architecture into multiple DeviceNet safety segments allows time-critical safety loops to be optimized. Such scalable integration of multiple network segments can result in shorter loop closure times and therefore tighter safety exclusion zones. In one approach, stand-alone cell-level industrial automation protocol (e.g., DeviceNet, EtherNet/IP, etc.) segments can be integrated on an EtherNet/IP backbone, enabling peer-to-peer communications across multiple cells.

Figure 3:
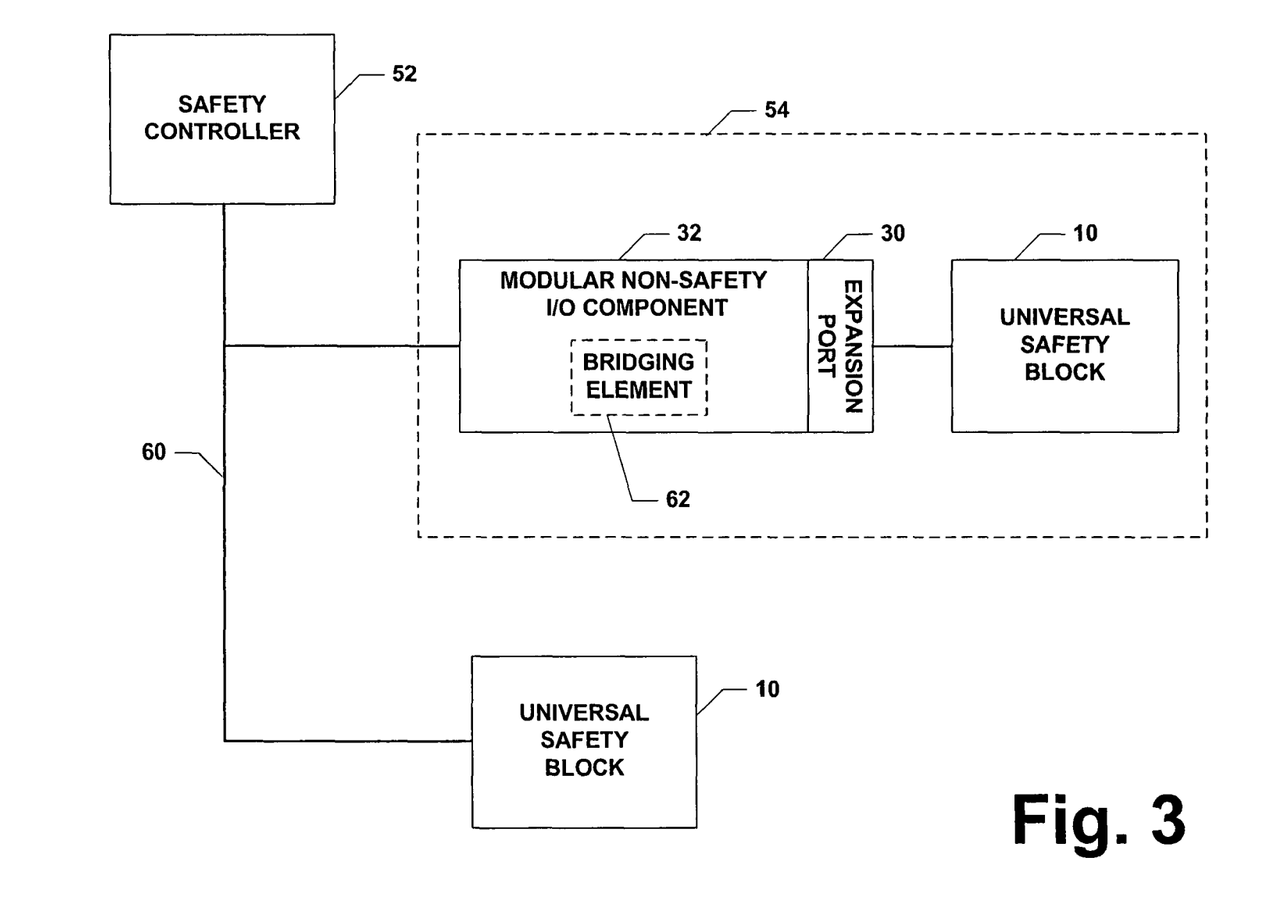
FIG. 3 illustrates an industrial control system that includes a modular non-safety I/O component coupled with a universal safety block and a standalone universal safety block, in accordance with an aspect of the subject invention.

Referring now to FIG. 3, which illustrates a control system wherein the USB 10 is employed as both a backplane module and a standalone safety block. A safety controller 52 communicates with a field I/O component 54 which includes the MNIC 32, the expansion port 30, and the USB 10. A bridging element 62 is communicates safety data to the USB 10 via the expansion port 30. As employed in the field I/O component 54, the USB 10 is utilized as a backplane module. In addition, the USB 10 communicates directly to the safety controller 52 via a control network 60 as a standalone safety block.

Communication between the field I/O component (FIOC) 54, the USB 10 and the safety controller 52 is provided via the control network (e.g., DeviceNet, ControlNet, etc.) 60. The MNIC 32 identifies received messages and processes them based on whether they are safety messages or standard messages. If a data is determined to be non-safety, it is ported to a standard data table for processing via the MNIC 32. If, however, the data is determined to be safety, this safety data is bridged via the bridging element 62 to and/or from the USB 10 for processing. The bridging element 62 can be employed to properly handle received and/or transmitted data and can include hardware, software and/or firmware to transmit data from the safety network 60 to the MNIC 32 and the USB 10 within the FIOC 54. In addition, firmware and/or software can be updated periodically to specify handling of particular data within the MNIC 32 and/or the USB 10.

Although the embodiment illustrated in this control system shows the network 60 connected to the modular non-safety I/O component 32 then connected to the USB 10, substantially any combination of control devices are contemplated. In addition, standard (e.g., non-safety) and safety I/O can be ordered as desired. For example, two modular standard (e.g., non-safety) I/O components can be coupled to the MNIC 32. The USB 10 can be coupled to the first two modular standard I/O components and one or more standard I/O components (not shown) can be coupled to the four modular safety components. Thus, substantially any combination of safety and standard I/O modules and corresponding data types (e.g., digital, analog, strain gauge, thermocouple, linear transducers, etc.) are contemplated.

The MNIC 26 and the USB 10 can communicate with the control network (e.g., DeviceNet, ControlNet, etc.) 60 along a common backplane. Connection from the control network 60 to the backplane is facilitated via a network interface (not shown). This backplane can be included in the form factor of each of the I/O devices that communicate within the control system. In this manner, the backplane will be appended each time an additional modular I/O device and/or block I/O device is added to the system. Communication across the backplane to the USB 10 can be facilitated utilizing the backplane interface 24.

In contrast, the USB 10 can communicate with the control network 60 directly utilizing the network interface 22. In one embodiment, the network interface 22 can be a plug-in receptacle that receives a DeviceNet safety network cable to interact with the USB 10 as a standalone safety block within a control architecture. The network interface 22 can consist of one or more screw terminals, sockets, etc. employed to provide an electrical connection from the USB 10 to the control network 60. It is to be appreciated that the foregoing is for illustrative purposes only and that the USB 10 can directly communicate with a network utilizing substantially any protocol and/or standard.

In a standalone approach, the USB 10 can receive, process and transmit safety related data. Additional I/O modules can be appended to the USB 10 to provide a flexible control architecture. In one example, additional I/O modules are added to the standalone USB 10 to accommodate an additional control system. In another approach, a network interfaces provides direct communication wherein the standalone USB 10 is employed as a backplane module (e.g., as illustrated in FIOC 54).

Figure 4:
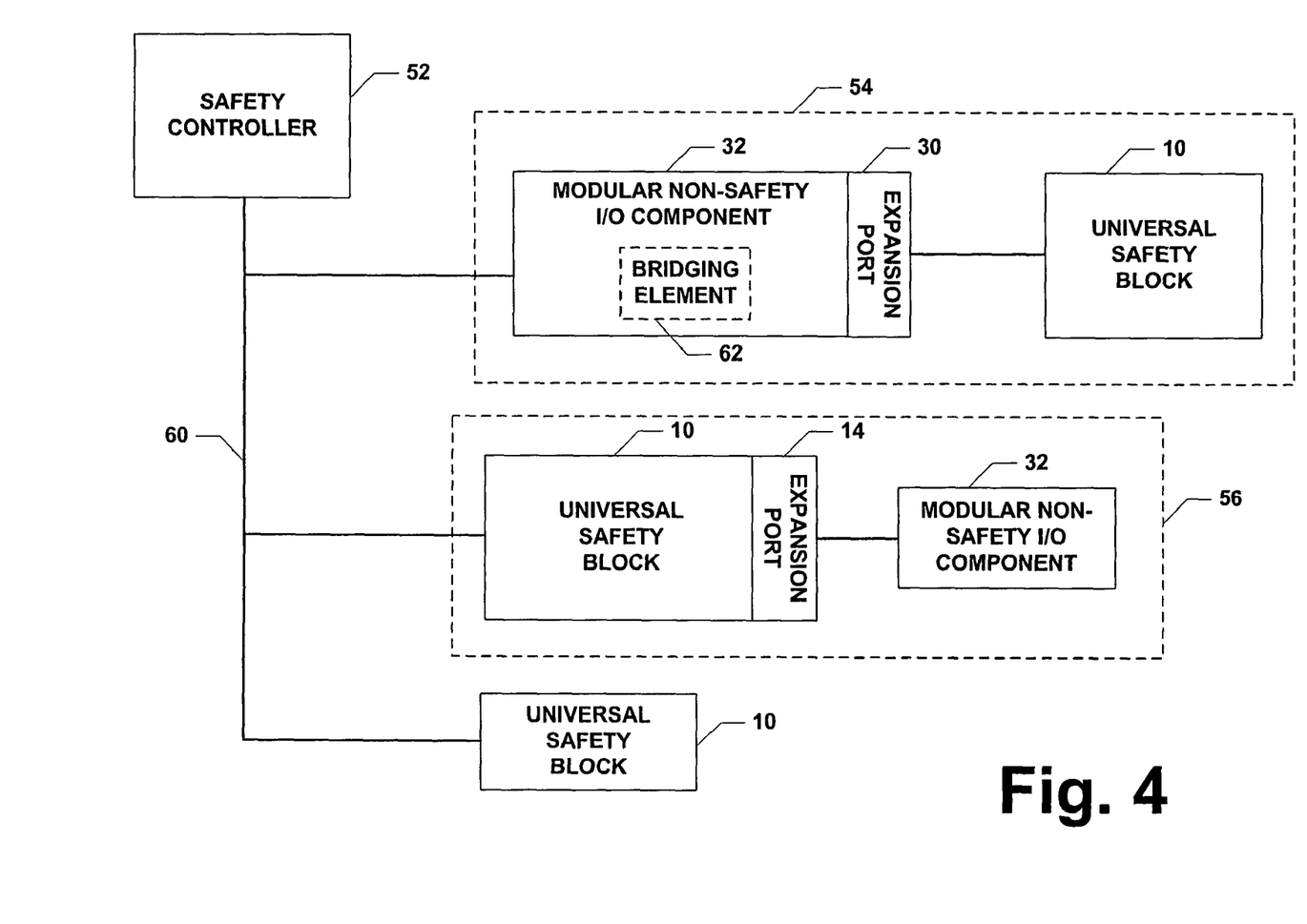
FIG. 4 illustrates a universal safety block as an expandable module, a standalone module, and a backplane module, in accordance with an aspect of the subject invention.

FIG. 4 illustrates a control architecture wherein the USB 10 is employed in three different aspects of control I/O. In a first aspect, the USB 10 is employed with the FIOC 54 as a backplane module. In a second aspect, the USB 10 is employed within a FIOC 56 as an expandable safety block wherein one or more additional I/O modules can be coupled to the USB 10 for expanded I/O capability. In a third aspect, the USB 10 is employed as a standalone safety block that can communicate directly with the control network 60.

The USB 10 can communicate with one or more control devices and employed in any number of locations throughout a control architecture. Such flexibility can be facilitated via the network interface 22, the backplane interface 24 and the backplane extension 26. Thus, the network interface 22 can facilitate communication between the USB 10 and the control network 60. The USB 10 can also employ the network interface 22 and the backplane extension 26 to communicate with both the control network and the various I/O on a backplane at substantially the same time. The backplane interface can be employed to communicate with a backplane when the USB 10 is employed as a backplane module.

Figure 5:
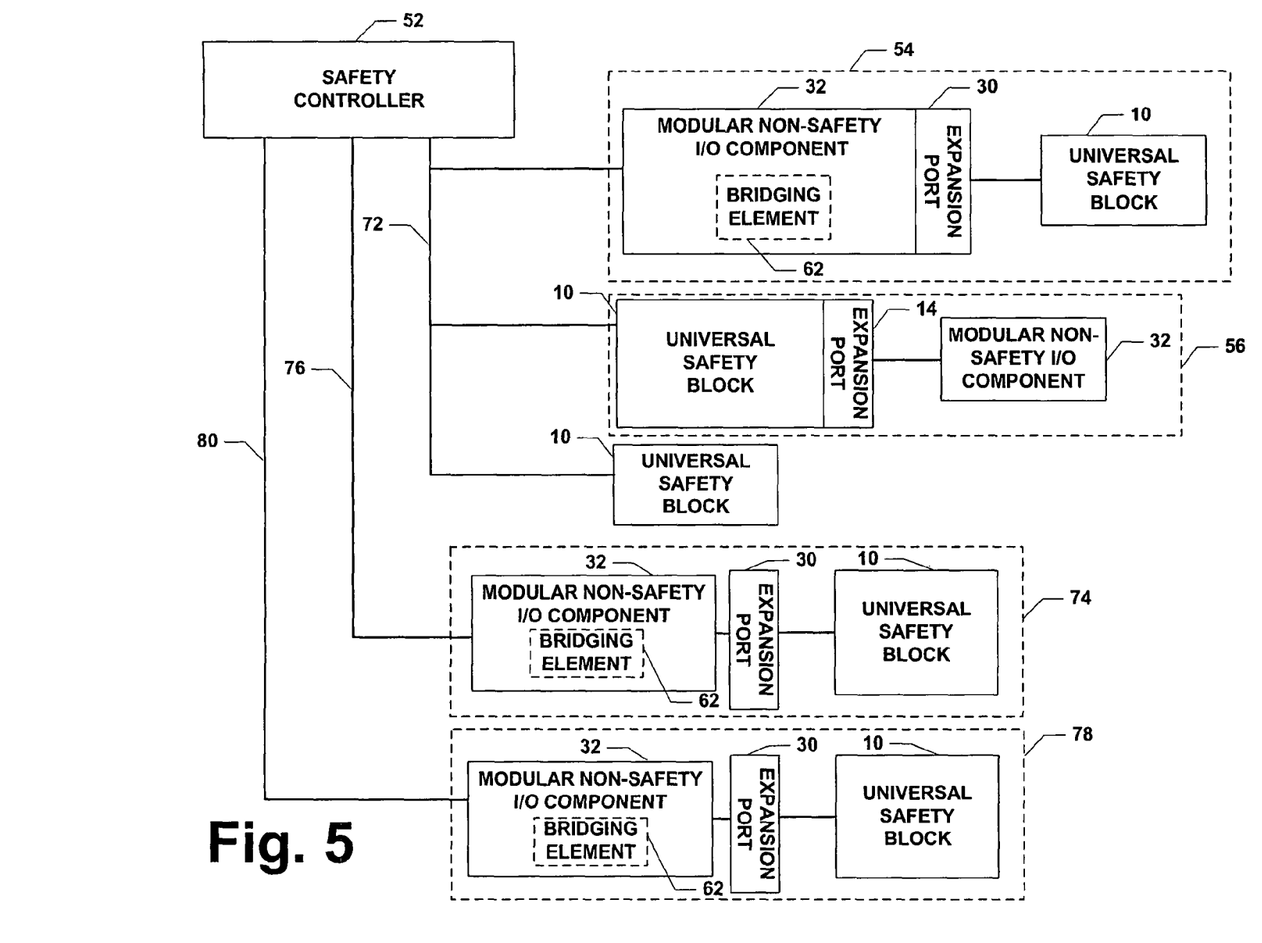
FIG. 5 illustrates an industrial control system that includes a plurality of field I/O components that process safety and non-safety signals that communicate utilizing one or more industrial automation protocols, in accordance with an aspect of the subject invention.

FIG. 5 illustrates a control network wherein the field I/O component (FIOC) 54 is coupled to the controller 52 and the modular safety I/O component 56 via a first communication protocol (e.g., DeviceNet, ControlNet, EtherNet/IP, etc.) network 72. In addition, a second FIOC 56 and a standalone USB 10 are coupled to the controller 52 via the first communication protocol.

A third FIOC 74 is coupled to the controller 52 via a second communication protocol (e.g., DeviceNet, ControlNet, EtherNet/IP, etc.) network 76. A fourth FIOC 78 is coupled to the controller 52 via a third communication protocol (e.g., DeviceNet, ControlNet, EtherNet/IP, etc.) network 80. In one approach, each of the three networks 72, 76 and 80 utilize a different protocol.

The FIOCs 54, 56, 74 and 78 each include the MNIC 26, the bridging element 62, the expansion port 14, and the USB 10. It is to be appreciated that the USB 10 can include any number of input and/or output terminals wherein each terminal can process any type and/or format of data. Similarly, the MNIC 26 can include substantially any number of non-safety data in a variety of formats. The MNIC 32 can process the non-safety data received from each of the protocol networks 72, 76 and 80. The bridging element 62 ports safety data to the USB 10 for processing.

In order to communicate with the various control networks 72, 76 and 80, the network interface can employ an artificial intelligence (AI) component (not shown) to determine the type of protocol received by the network interface. For example, the AI component can determine the appropriate processing of data within such protocol. In one aspect of the subject invention, the appropriate format and/or processing of received data can be determined by machine learning wherein one or more training sets of data with examples of desired results and/or undesired results for data format and/or processing techniques can be utilized to train the system. In another aspect, initial conditions, based on one or more features that indicate desired results, can be utilized. Such initial conditions can be adjusted over time and in response to user actions associated with returned results in order to improve discrimination.

In addition, as utilized herein, the term "inference" refers generally to the process of reasoning about or inferring states of the system, environment, and/or user from a set of observations as captured via events and/or data. Inference can be employed to identify a specific context or action, or can generate a probability distribution over states, for example. Inference can refer to techniques employed for composing higher-level events from a set of events and/or data. Various classification schemes and/or systems (e.g., support vector machines, neural networks (e.g., back-propagation, feed forward back propagation, radial bases and fuzzy logic), expert systems, Bayesian networks, and data fusion) can be employed in connection with performing automatic and/or inferred action in connection with the subject invention.

Industrial automation fieldbuses and associated protocols can enable control, configuration and data collection, and provides benefits such as: media independence; multiple data exchange options; seamless, multi-hop routing; and producer/consumer services. Typical applications for industrial automation fieldbuses (e.g., protocol networks 72, 76 and 80) can include press control, robot weld cell control, transfer lines, packaging machines, burner management, emergency shut down and/or ski lifts, for example. In addition, industrial automation protocols can be readily integrated into existing standard plant-wide systems various manufacturing settings such as the automotive, semiconductor, entertainment and food and beverage industries.

Industrial automation fieldbus networks can be based on implementation in existing networks and provide significant flexibility to the user in how safety solutions are implemented. One advantage is if a user initially installs a "safety only" architecture, the user can easily upgrade in the future to an integrated system network (e.g., safety and standard) by adding standard devices on the network. Such integration can be performed while maintaining integrity of the safety and non-safety data throughout the network.

One industrial automation protocol, the EtherNet/IP standard, allows various devices such as I/O and controls from multiple vendors to communicate over a network running an Ethernet protocol. Such an approach is in contrast with proprietary approaches where controllers running Ethernet protocols from a specific vendor can work only with that vendor's Ethernet I/O.

EtherNet/IP allows interoperability between devices from different vendors since Ethernet only defines a physical media, a scheme for sharing the physical media, and a simple frame format and addressing method for moving data packets across a network. Upper-layer protocols that are not defined by Ethernet determine network functions and how devices communicate with each other on the one or more industrial automation protocol networks 72, 76 and 80. Upper-layer protocols must run on top of Ethernet and such upper-layer protocols can be employed by the EtherNet/IP protocol to provide standards employed in industrial settings.

One of the upper layers in ordinary Ethernet is TCP/IP, Transmission Control Protocol/Internet Protocol which provides services that let devices transfer messages to each other. However, TCP/IP does not guarantee that the devices know what to do with the messages they receive. Instead, an application-layer protocol can be utilized to let connected devices understand received messages.

Typical application-layer protocols are HTTP for the World Wide Web and SNMP for e-mail. Industrial devices, however, don't have such protocols at the application level. EtherNet/IP defines one of the few such layers. EtherNet/IP uses an approach called TCP/IP encapsulation to let messages for these protocols pass over an Ethernet network. In one example, a device running DeviceNet would encapsulate a DeviceNet message as the data portion of an Ethernet message. The message could then be processed and/or communicated by a chip running the data link layer of Ethernet.

EtherNet/IP protocol networks also employ UDP/IP (User Datagram Protocol/IP) to allow multicasting via implicit messaging. Multicasting is typified by a source sending a message to a group of destinations (as compared to unicasting: sending a different message to each destination). Implicit messaging puts only real-time I/O information in a data field of the Ethernet message, but no protocol information. The purpose of multicasting is to minimize network traffic, and the purpose of implicit messaging is to minimize the time needed to process the message at the node receiving it. The benefit is that such messages can be short, involve little processing overhead, and promote time-critical performance needed for control.

Use of message encapsulation and other techniques lets a message originating on one industrial automation fieldbus such as DeviceNet pass to another network such as EtherNet/IP, without using application-layer protocols. In addition, this scheme allows network bridging devices (e.g., bridging element 62) to forward the contents of messages between network ports without acting on the contents of the message.

Another industrial automation protocol is DeviceNet which can allow devices to synchronize for precise system performance and can also be utilized with one or more safety systems. Such features include automatic checking for duplicate node addresses; built-in retries at the data-link layer; priorities established by configuration; bit error rate of approximately $\leq 10^7$ under stress (i.e., approximately one error transmitted every 150 years on a fully loaded system). DeviceNet also employs error counters for each connection to the network and utilizes connection based messaging so both producer and consumer can identify data failure. Also, standard DeviceNet media and topology requires no changes when used in safety implementations which means current DeviceNet users can continue to use existing wiring to implement a safety system by adding DeviceNet safety devices to the existing network, as can be true for other industrial automation protocols. In this manner, end users can integrate standard and safety controls on a single network. This feature can provide significant cost savings, as safety devices that are usually hardwired to a safety controller can now be directly connected on an existing DeviceNet, sharing the network with other safety and standard devices.

The DeviceNet safety protocol ensures that standard devices do not interfere with the function of the safety devices and vice versa. With conventional safety protocols, manufacturers are required to run a separate network just for safety controls, which adds an unnecessary level of complexity to a system. In addition, a separate network not tightly integrated into the standard control system architecture often precludes systems from responding uniquely to each type of fault.

When dealing with multiple networks, it is important to consider how safety loops are closed. There are two approaches for closing a loop between an input and output device. The first is the controller-centric approach, which mandates that all safety loops go through a safety PLC, such as the controller 52. The second is the safety network controller approach, which doesn't require a safety PLC to be part of the safety loop. The latter method could be categorized as a conventional relay replacement and is typically used for very tight loop closures.

Both approaches have advantages and are not mutually exclusive, which means manufacturers can use a combination of both. A DeviceNet safety system supports both approaches by allowing any device to talk to any other safety point on the same segment or another segment in the network architecture.

With the DeviceNet safety protocol, diagnostics go beyond the status checking of individual nodes connected to the network by allowing the application to test the integrity of the full loop. Input and output modules can have features such as "pulse test", which verifies that the input or output circuit is functioning and not shorted, and "data echo," which uses feedback to check that an output module has received and acted on a command.

Advanced diagnostics can also check the external load to verify that voltage is applied to the actuator, and input or output modules have the capability to detect open or short-circuit wires and loss of power. Industrial automation protocols can automatically inherits the bridging and routing capabilities employed by users of EtherNet/IP, ControlNet and DeviceNet. Therefore, from a plant wide perspective, DeviceNet safety users benefit from a multi-link architecture. In one example, a single DeviceNet safety network can contain as many as 64 devices, but as DeviceNet safety is based on a seamless, multi-link architecture, the maximum device count is virtually unlimited. In another example, multiple DeviceNet safety segments can be interconnected using a high-speed EtherNet/IP backbone, with all the nodes communicating as seamless as if they are on the same segment.

When designing a safety system, not only must the number of sensors and actuators be considered, but also the maximum response time from sensors to actuator. In practice, a control network designer will typically minimize the number of nodes on a single segment to maximize the network bandwidth available to each node. Such a reduction becomes even more significant as the number of sensors that can be connected to a single node is much smaller on safety networks than on standard networks due to the safety protocol overhead. As a remedy, engineers can break DeviceNet safety solutions into separate networks, with each network configured to provide the precise response time needed, while transmitting only required information to the other networks, therefore maximizing bandwidth. In addition to separate networks, the multi-loop feature and safety controllers also help ensure performance.

This feature allows original equipment manufacturers (OEMs) to design standalone machines each with its own separate subnet, ensuring that safety loops on one machine can be accessed but not negatively impacted by other machines. From an OEM's standpoint, the ability to ensure and take responsibility for a performance output, such as their machine's safety exclusion zone, is critical. An end user, meanwhile, also benefits because multiple machines can be cross-interlocked using an EtherNet/IP backbone without risking the set parameters or performance integrity of any individual machine.

Integration is beneficial for standard applications, but end users may be cautious about taking advantage of the feature in safety applications, as there is a need (stated in IEC 61508) to maintain standard and safety control systems as independent entities. The IEC 61508 standard requires one of two approaches: physical separation of safety and standard control functionality or logical separation. DeviceNet safety supports both approaches but is optimized to enforce logical separation. This logical separation ensures safe operation and provides greater opportunities to improve productivity at a lower cost than implementing physical separation. A single controller platform can be used to enforce logical separation, which simplifies configuration of the safety system and reduces training. Further it enhances the overall safety of the system by minimizing the level of specialist expertise required to maintain the system.

Figure 6:
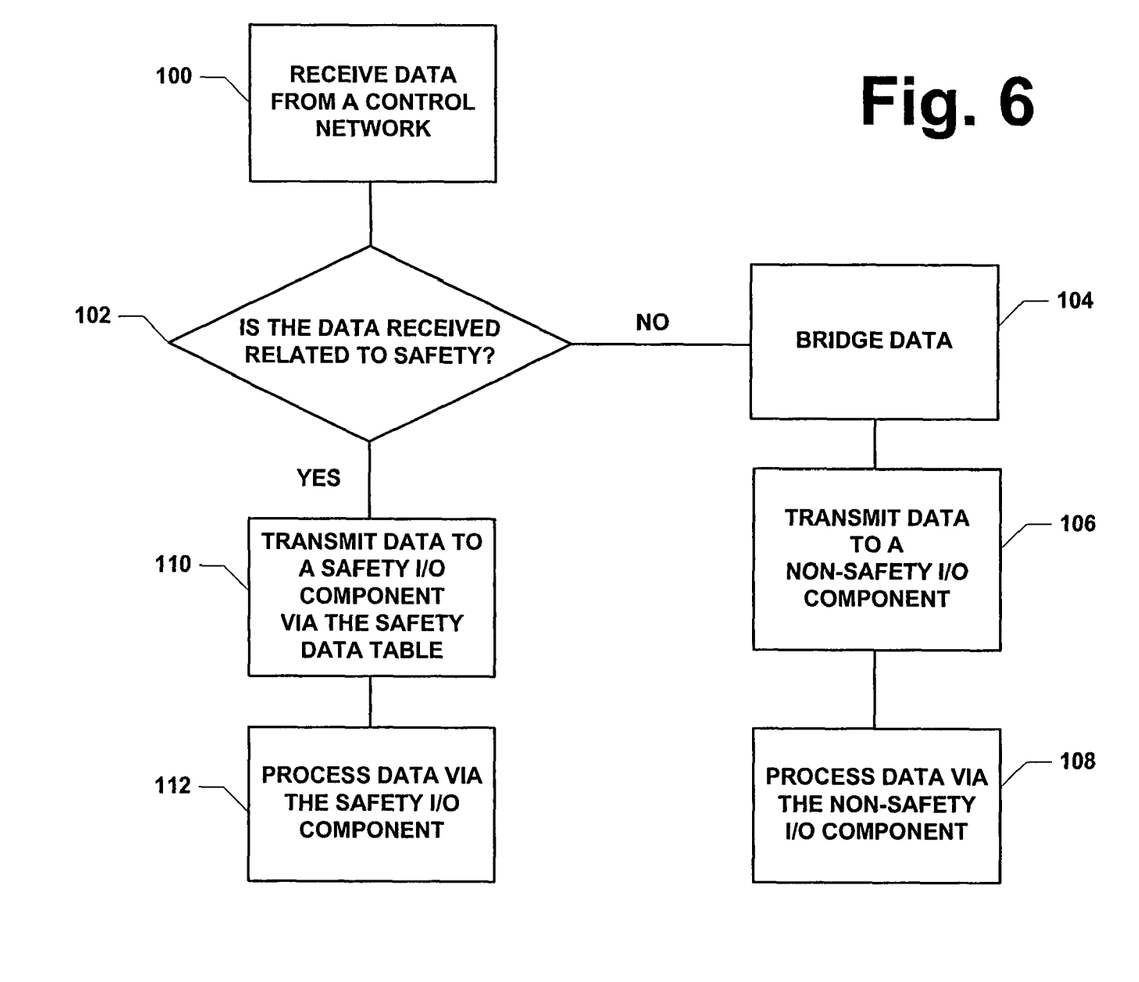
FIG. 6 illustrates a methodology that determines if data is related to safety or non-safety and processes such data accordingly, in accordance with an aspect of the subject invention.
Figure 7:
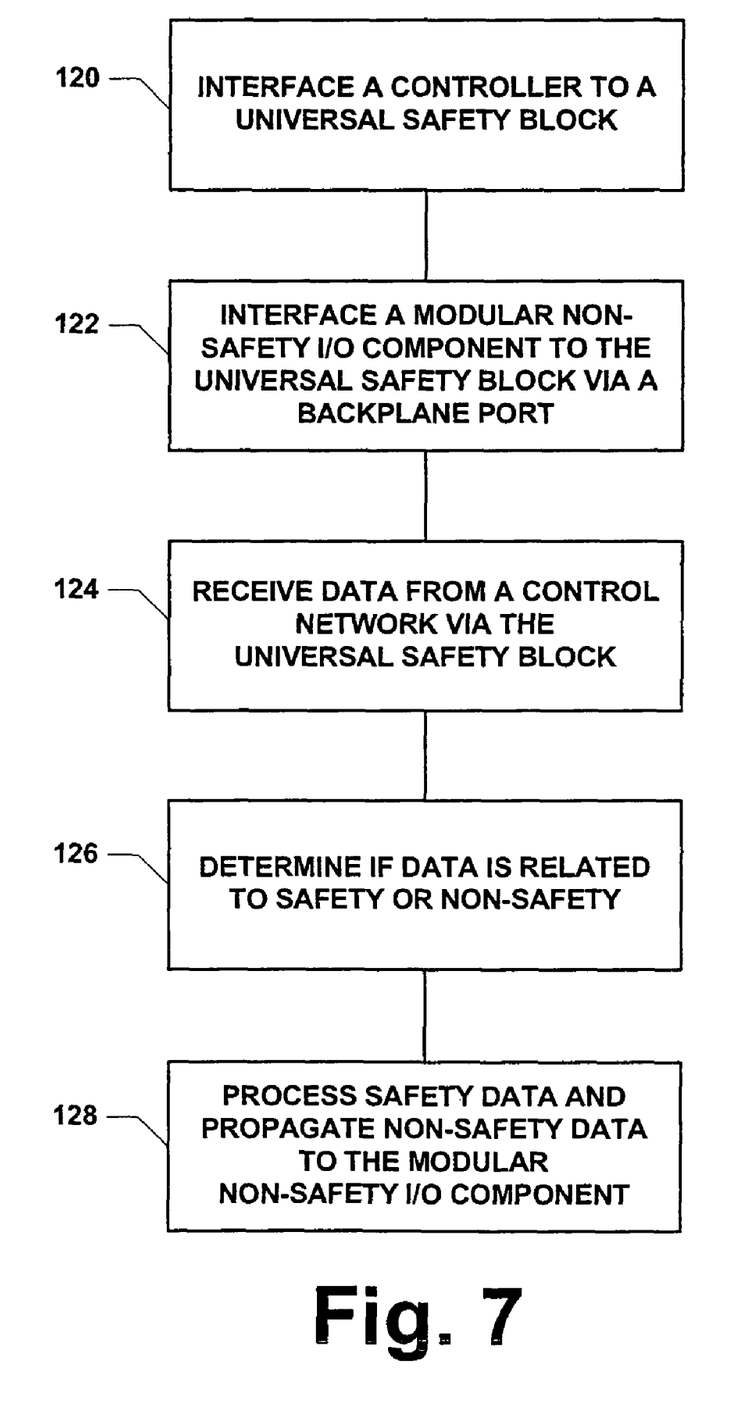
FIG. 7 illustrates a methodology that employs block and modular I/O components to process data related to safety or non-safety, in accordance with an aspect of the subject invention.

While, for purposes of simplicity of explanation, the methodologies of FIGS. 6 and 7 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

Referring now to FIG. 6, which illustrates a methodology to determine if received data is related to safety or non-safety and to process such data accordingly. At 100, data is received from a control network via a network interface. Received data can be transmitted through the network utilizing appropriate media such as CAT-5, coaxial, twisted pair, etc. In addition, data can be transmitted via one or more protocols such as DeviceNet, ControlNet, EtherNet/IP, etc. The network interface can be coupled to the control network via one or wired or wireless means. Additionally, data can be received on a periodic basis, based on condition or on a continuous basis.

At 102, one or more processing components determine if such data is related to safety or non-safety. In one example, the data is compared to a look up table of known safety data. If the received data matches data on the list, the data is deemed to be safety data. In another example, the safety table is coupled to an AI component (not shown) and an inference is made as to the type of data received (e.g., safety or non-safety) based on one or more factors. Such factors can include data value, data source, data format, associated metadata, overhead, etc. Data can be interfaced to the safety table as it is received or can be first accumulated in a memory (not shown) interface the safety table on a periodically.

At 104, once a determination is made that the data is not related to safety, the data is bridged to a standard data table. The standard data table can contain a listing of standard (e.g., non-safety) data and/or determine that such data is non-safety based on an inference, as noted above. Alternatively, data can be designated as non-safety by default after comparison to the safety table at 102.

At 106, data is transmitted from the standard data table to a non-safety I/O component. The non-safety I/O component can be associated with any type of profile or form factor. Such form factor can additionally be designed to prevent the intrusion of dust and/or liquids in compliance with one or more standards (e.g., IP 67). In addition, the non-safety I/O component can be a block design wherein a plurality of predetermined I/O terminals are designated. In another embodiment, the non-safety I/O component can be a modular design wherein I/O terminals are added to the control system as needed. It is to be appreciated that although a single non-safety I/O component is discussed, any number of non-safety I/O components are contemplated with substantially any profile and/or form factor design (e.g., block, modular, etc.).

At 108, data is processed via the non-safety I/O component. Such data processing can involve analyzing and manipulating one or more parameters associated with the data. In one example, a data packet is opened and various parameters are extracted for use in the control system. For instance, various pieces of information such as a bit string associated with a particular control device, overhead error checking information, metadata and the like can be analyzed. After processing the data, the non-safety I/O component can perform any number of functions such as returning to an idle mode to await further instruction, processing other received data, etc.

At 110, after a determination is made that received data is related to safety, such data is transmitted from the safety data table to a safety I/O component. As noted, the safety I/O component can be in any form factor, design, layout or profile. In addition, the safety I/O component can be in a block design and/or a modular design. In addition, substantially any number of terminals, data types, formats and the like can be employed.

At 112, the data is processed via the safety I/O component. Processing such data can include determining the source of the data, the value of particular data strings, data format, associated security level, emergency level and the like. In this manner, the safety data can be analyzed to determine if an action needs to be taken. In one example, the action can be to place one or more data values into a safe state. Such safe state can be predetermined such as power off, power on, toggle data value, etc.

FIG. 7 illustrates a methodology of intermixing block and modular I/O components. In addition to intermixing I/O components, signals can be mixed wherein both safety and non-safety signals are transmitted to the I/O components. At 120, a controller is interfaced to a universal safety block. The controller can be employed to receive, store and/or transmit data based on any number of factors. In addition, a memory can be associated with the controller for data and/or algorithm storage. A processor can be employed to execute one or more commands related to data manipulation and/or one or more additional processes and/or tasks.

The controller can be configured to communicate utilizing a particular language or protocol. In one example, the controller can communicate on a DeviceNet network and be hardwired to the network interface. By way of further example, the controller can receive a plurality of process control data from various disparate control components in a particular architecture. For instance, data can be gathered from one or more drives, solenoids, sensors, measurement systems, thermocouples, encoders, etc.

At 122, a modular non-safety I/O component is interfaced to the universal safety block via an expansion port. The modular non-safety I/O component can receive, store, process and/or output non-safety data transmitted from the expansion port. The expansion port is employed to allow one or more modular I/O components to be coupled to the block I/O component to provide flexible I/O capability for a control architecture. It is to be appreciated that any number of expansion ports can be employed to couple one or more block I/O components to one or more modular I/O components. Further, the I/O components can be employed specifically for all safety data, all non-safety data or any desired combination of safety and non-safety data. At 126, data is received from a control network via the network interface. At 128, data is sorted and processed based on whether the data is related to safety or non-safety.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A system that facilitates communication of safety and non-safety data within a control network, comprising:
   a universal safety block that receives safety and non-safety data from an outside source via one or more of a network interface that receives and/or transmits data directly from a network, a backplane interface that receives and/or transmits data from a backplane, and a backplane extension that receives and/or transmits data from a backplane;
   a processing component that receives data from at least one of the network interface, the backplane interface and the backplane extension, determines if the received data is safety data or non-safety data, and routes the safety data to a safety channel and the non-safety data to a non-safety data channel; and safety input/output (I/O) circuitry that receives the safety data from the processing component via the safety channel, wherein the safety data is utilized to communicate to at least one control device within the control network.

2. The system according to claim 1, wherein the processing component further includes:
a logic control circuit that analyzes the received data and determines if the data is related to safety or non-safety.

3. The system according to claim 2, wherein the processing component further includes:
a safety data table that receives safety data from the logic control circuit, wherein the processing component processes the received data and communicates the safety data to the safety I/O circuitry.

4. The system according to claim 3, wherein the safety data table contains a list of safety data that is compared to the received data to determine if the received data is safety or non-safety data.

5. The system according to claim 1, wherein data is transmitted redundantly via two channels throughout the network such that a first channel transmits normal data and a second channel transmits inverted data.

6. The system according to claim 5, wherein data from the first channel is crosschecked against data from the second channel to verify data integrity.

7. The system according to claim 2, wherein the processing component further includes:
a bridging element that receives non-safety data from the logic control circuit and transmits this data to one or more control elements.

8. The system according to claim 1, wherein the safety control module is housed in a form factor that substantially protects against dust and the effect of immersion between 15 cm and 1 m of liquid.

9. The system according to claim 1, wherein the safety control module executes firmware to determine if safety data is defective.

10. The system according to claim 9, wherein one or more data values are set to a pre-determined safe state if the data is determined to be defective.

11. The system according to claim 1, wherein the network communicates utilizing at least one of a DeviceNet, a ControlNet, a Control Area Network (CAN) and an EtherNet/ Internet (IP) protocol.

12. A field input/output (I/O) component that processes safety and non-safety data within an industrial control architecture, comprising:
a non-safety I/O component that receives data related to both safety and non-safety from an outside source, determines if the data is safety data or non-safety data, processes the non-safety data and communicates the safety data outside the non-safety I/O component by routing the safety data to a safety channel and the non-safety data to a non-safety data channel;
wherein the non-safety I/O component comprises a logic control circuit configured to determine if the data is safety data is based at least in part upon interfacing with a safety data table;
wherein the safety data table contains a list of known safety data configured to be compared by the logic control circuit with the received data to determine that the received data is safety data when the received data and data in the list match one another;
an expansion port that is coupled to the non-safety I/O component that allows one or more components to communicate with the non-safety I/O component; and
a universal safety block coupled to the expansion port that receives, processes and outputs the safety data to one or more components.

13. The field I/O component according to claim 12, wherein the non-safety I/O component is a modular component.

14. The field I/O component according to claim 12, wherein the non-safety I/O component is a block component.

15. The field I/O component according to claim 12, wherein at least one of the non-safety I/O component and the universal safety block employ updatable firmware to process received data.

16. The field I/O component according to claim 12, wherein communication to one or more external devices is accomplished utilizing at least one of a DeviceNet, a ControlNet, a Control Area Network (CAN) and an EtherNet/Internet Protocol (IP) Protocol.

17. The field I/O component according to claim 12, further including:
a monitoring component that analyzes received data and sets one or more outputs of the safety I/O component to a pre-determined safe state if the received safety data is defective.

18. The field I/O component according to claim 12, wherein at least one of the non-safety I/O component and the universal safety block communicate directly to an industrial automation fieldbus.

19. A method for processing data within a control architecture, comprising:
receiving data from a control network;
determining if the data is related to safety based at least in part upon interfacing with a safety table;
inferring data received is safety data or non-safety data with an artificial intelligence component coupled to a memory with the safety table stored therein based on one or more factors;
routing the safety data to a safety channel and the non-safety data to a non-safety data channel;
transmitting data related to safety to a safety input/output (I/O) component; and
processing the safety data via the safety I/O component.

20. The method according to claim 19, further comprising:
transmitting the non-safety data at least one of to and from a non-safety I/O component; and
processing the non-safety data via the non-safety I/O component.

21. The method of claim 19, wherein the factors comprise a data value, a data source, a data format, associated metadata, and overhead.

* * * * *